United States Patent
Yang et al.

(10) Patent No.: US 11,435,224 B2
(45) Date of Patent: Sep. 6, 2022

(54) STRINGED INSTRUMENT RESONANCE ANALYSIS DEVICE

(71) Applicants: FON DA TECH CO., LTD., Zhudong Township (TW); Tai-I Yang, Hsinchu (TW)

(72) Inventors: Tai-I Yang, Hsinchu (TW); Dai-Ting Chung, Tainan (TW); Chien-Hung Tu, Tainan (TW); Jen-Yu Chung, Tainan (TW)

(73) Assignee: Fon Da Tech Co., Ltd., Hsinchu County (TW)

( * ) Notice: Subject to any disclaimer, the term of this patent is extended or adjusted under 35 U.S.C. 154(b) by 141 days.

(21) Appl. No.: 16/930,484

(22) Filed: Jul. 16, 2020

(65) Prior Publication Data

US 2021/0018359 A1 Jan. 21, 2021

(30) Foreign Application Priority Data

Jul. 17, 2019 (TW) ................................. 108209313

(51) Int. Cl.
*G01H 13/00* (2006.01)
*G10G 5/00* (2006.01)
*H04R 1/02* (2006.01)

(52) U.S. Cl.
CPC ............... *G01H 13/00* (2013.01); *G10G 5/00* (2013.01); *H04R 1/025* (2013.01)

(58) Field of Classification Search
CPC .................................. G01H 13/00; G10G 5/00
See application file for complete search history.

(56) References Cited

U.S. PATENT DOCUMENTS 2,911,872 A * 11/1959 Carl .................... G10D 3/00
84/173
5,031,501 A * 7/1991 Ashworth ............. G10H 3/146
84/723

(Continued)

FOREIGN PATENT DOCUMENTS

FR 2501885 A1 9/1982

OTHER PUBLICATIONS

International Patent Search Report Issued by Foreign Patent Office for Appln. No. (20186406.3-1001)/(dated Dec. 10, 2020).

*Primary Examiner* — Robert W Horn
(74) *Attorney, Agent, or Firm* — Rosenberg, Klein & Lee (57) ABSTRACT

The present disclosure relates to a stringed instrument resonance analysis device which uses a scientific detection method to evaluate the resonance effect of stringed instrument, wherein the stringed instrument resonance analysis device has a cabinet, a holder, a resonant sounder, a sonic generator, at least one sonic collector and a spectrum analyzer. The cabinet forms an accommodating space therein. The holder a holder is disposed in the accommodating space and used to fix and hold the stringed instrument. The resonant sounder is disposed in the accommodating space and fixed and clamped to a bridge on a loudspeaker box of the stringed instrument. The sonic generator is connected to the resonant sounder. The sonic collector is disposed in the accommodating space and adjacent to the loudspeaker box of the stringed instrument. The spectrum analyzer is connected to the at least one sonic collector.

14 Claims, 6 Drawing Sheets

(56) References Cited

U.S. PATENT DOCUMENTS

| | | | | |
|---|---|---|---|---|
| 5,537,908 A * | 7/1996 | Rabe | G10D 3/00 | 84/453 |
| 5,600,081 A * | 2/1997 | Simjian | G10D 3/22 | 84/453 |
| 6,320,113 B1 | 11/2001 | Griffin et al. | | |
| 7,227,068 B1 * | 6/2007 | Van Doren | G10D 3/00 | 84/297 R |
| 7,678,987 B2 * | 3/2010 | Lye | G10D 3/22 | 84/723 |
| 7,932,457 B2 * | 4/2011 | Hall | G10D 3/22 | 84/723 |
| 7,968,779 B2 * | 6/2011 | Courtright | G10D 3/22 | 84/320 |
| 7,977,555 B2 * | 7/2011 | Hall | G10D 3/22 | 84/291 |
| 7,977,565 B1 * | 7/2011 | Lye | G10D 3/00 | 84/723 |
| 8,134,064 B2 * | 3/2012 | Sanns, Jr. | G10H 3/18 | 84/723 |
| 8,642,877 B1 * | 2/2014 | Blish | G10H 3/22 | 84/723 |
| 9,243,950 B2 * | 1/2016 | Raniere | B60R 13/08 | |
| 9,412,347 B2 * | 8/2016 | Kobayashi | G10H 3/146 | |
| 9,583,076 B2 * | 2/2017 | Nigro | G10D 3/00 | |
| 10,121,457 B2 * | 11/2018 | Gilbert | G10H 3/24 | |
| 10,621,965 B2 * | 4/2020 | Abiko | H04R 1/025 | |
| 10,762,886 B2 * | 9/2020 | Nakazawa | G10G 7/00 | |
| 2006/0117938 A1 * | 6/2006 | Gillette | G10H 3/186 | 84/723 |
| 2008/0190260 A1 * | 8/2008 | Lye | G10D 3/00 | 84/173 |
| 2008/0289483 A1 | 11/2008 | Hall et al. | | |
| 2009/0229445 A1 * | 9/2009 | Courtright | G10D 3/22 | 84/453 |
| 2009/0293707 A1 * | 12/2009 | Suhr | G10D 3/22 | 84/723 |
| 2011/0167991 A1 * | 7/2011 | Sanns, Jr. | G10H 3/26 | 84/723 |
| 2013/0047825 A1 * | 2/2013 | Kernaghan | G10D 3/22 | 84/723 |
| 2019/0392806 A1 * | 12/2019 | Nakazawa | G10D 3/22 | |
| 2021/0018359 A1 * | 1/2021 | Yang | G10G 5/00 | |

\* cited by examiner

STRINGED INSTRUMENT RESONANCE ANALYSIS DEVICE

TECHNICAL FIELD

The present disclosure relates to an electronic device detection means, and in particular to, a stringed instrument resonance analysis device for evaluating the resonance effect of stringed instrument by using standardized data.

RELATED ART

The stringed instrument uses the vibration of the strings to emit sounds of various frequencies. Common stringed instruments include violin, viola, cello, double bass, guitar, bass, and ukulele.

Generally speaking, the stringed instrument is mainly composed of strings and loudspeaker box. When the strings are pulsed to make sound, the stringed instrument resonates through its loudspeaker box, so that people can hear beautiful string sounds.

In order to ensure that the stringed instrument can emit the best timbre when playing, the stringed instrument must be tuned every specific time, which also includes resonance detection for the loudspeaker box. However, the conventional technology performs the detection on the loudspeaker box resonance of the stringed instrument by the human ear listening method. There is no data standard for the detection method. All rely on the subjective determination of the tester, so there is a great possibility of misjudgment.

SUMMARY OF THE PRESENT DISCLOSURE

To solve the above technical problem, the present disclosure provides an electronic device detection means being a stringed instrument resonance analysis device, and the stringed instrument resonance analysis device is used to evaluate the resonance effect of stringed instrument by using standardized data.

According to an objective of the present disclosure, a stringed instrument resonance analysis device is provided to detect a stringed instrument. The stringed instrument resonance analysis device comprises: a cabinet, forming an accommodating space in the cabinet; a holder, disposed in the accommodating space and used to fix and hold the stringed instrument; a resonant sounder, disposed in the accommodating space and fixed and clamped to a bridge on a loudspeaker box of the stringed instrument; a sonic generator, connected to the resonant sounder; at least one sonic collector, disposed in the accommodating space and adjacent to the loudspeaker box of the stringed instrument; and a spectrum analyzer, connected to the at least one sonic collector.

According to the above features, an inner surface of the cabinet is provided with a sound-absorbing layer.

According to the above features, the holder comprises: a chassis, wherein the stringed instrument is placed on the chassis; and a rod, connected to the chassis and used to clamp and fix a neck of the stringed instrument.

According to the above features, the holder comprises: a frame and a first thread assembly, wherein the first thread assembly is connected to a top part of the frame, and the first thread assembly connects to and fixes a volute of the stringed instrument.

According to the above features, the holder further comprises: a second thread assembly, wherein the second thread assembly is connected to a bottom part of the frame, and the second thread assembly connects to and fixes the loudspeaker box of the stringed instrument.

According to the above features, the resonant sounder comprises at least one energy converter and a fixture, the fixture connects to the energy converter, and clamps and fixes the bridge.

According to the above features, the resonant sounder further comprises at least one buffer unit disposed between the energy converter and the fixture, wherein a number of the at least one buffer unit is corresponding to a number of the at least one energy converter.

According to the above features, the buffer unit is a flexible plastic block, silicone block, rubber block or spring.

According to the above features, a contact surface of the energy converter and the bridge is disposed with a buffer layer.

According to the above features, the buffer layer is a silicone film, rubber film or latex film.

According to the above features, a number of the at least one sonic collector is one, and the sonic collector is arranged in front of a panel of the loudspeaker box.

According to the above features, a number of the at least one sonic collector is one, and the sonic collector is arranged in back of a back plate of the loudspeaker box.

According to the above features, a number of the at least one sonic collector is one, and the sonic collector is arranged in side of a side plate of the loudspeaker box.

According to the above features, a number of the at least one sonic collector is three, and the sonic collectors are respectively disposed adjacent to a panel, a back plate and a side plate of the loudspeaker box.

According to the above features, the stringed instrument resonance analysis device further comprises: a display, connected to the spectrum analyzer.

According to the above features, the stringed instrument resonance analysis device further comprises: an amplifier, connected to between the resonant sounder and the sonic generator.

To sun up, the stringed instrument resonance analysis device of the present disclosure uses the resonant sounder to convert the energy, such that sonic of default frequency is converted to vibration, and the vibration energy is received by the bridge to from sonic and then resonates via the loudspeaker box. The resonance sonic can be collected by the sonic collector, and the spectrum analyzer analyzes and compares the received resonance sonic, such that the standardized and quantized data indicator can be used to evaluate the resonance effect of the stringed instrument.

DETAILS OF EXEMPLARY EMBODIMENTS

To understand the technical features, content and advantages of the present disclosure and its efficacy, the present disclosure will be described in detail with reference to the accompanying drawings. The drawings are for illustrative and auxiliary purposes only and may not necessarily be the true scale and precise configuration of the present disclosure. Therefore, the scope of the present disclosure should not be limited to the scale and configuration of the attached drawings.

Figure 1:
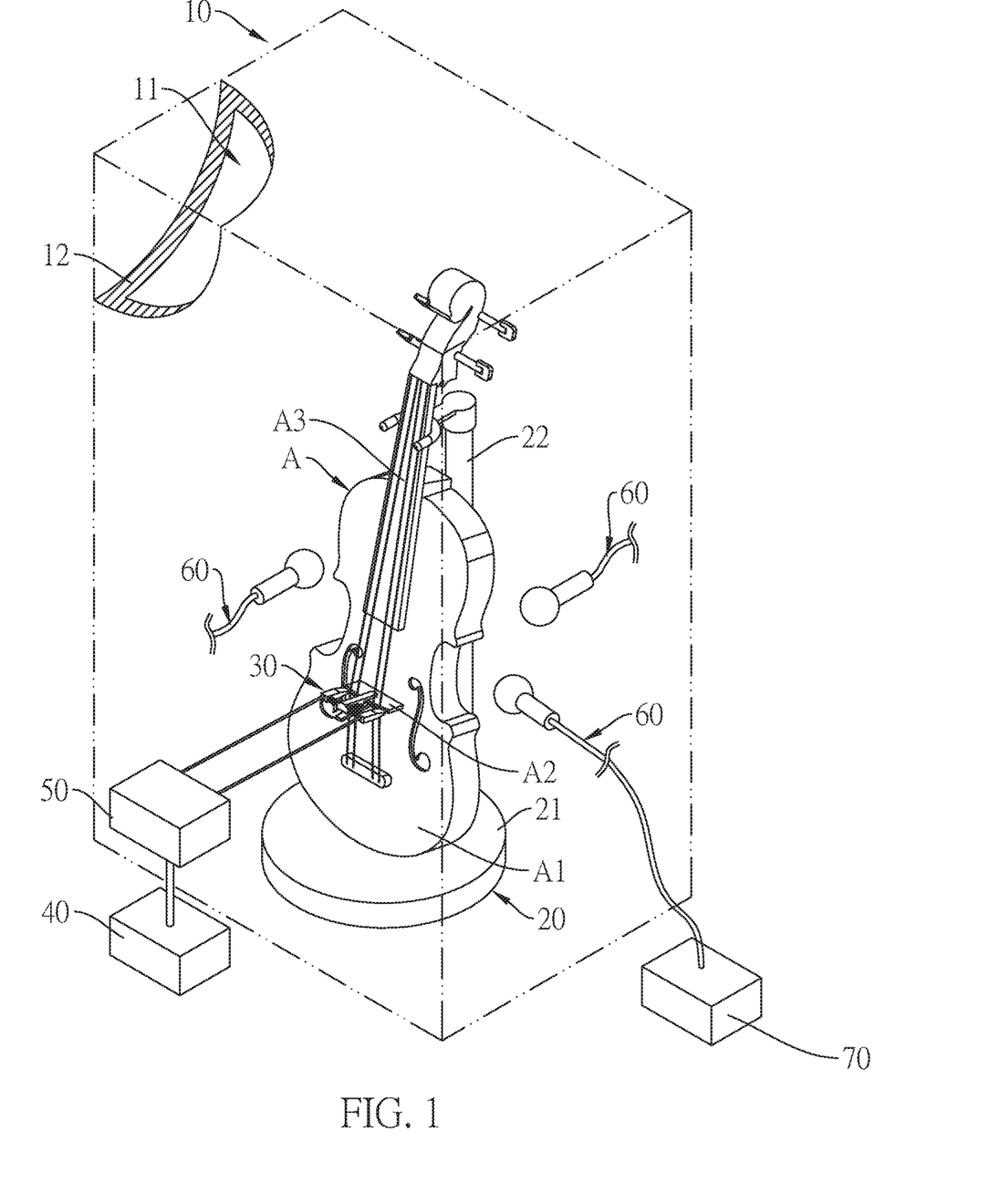
FIG. 1 is schematic diagram of a stringed instrument resonance analysis device of the present disclosure.
Figure 2:
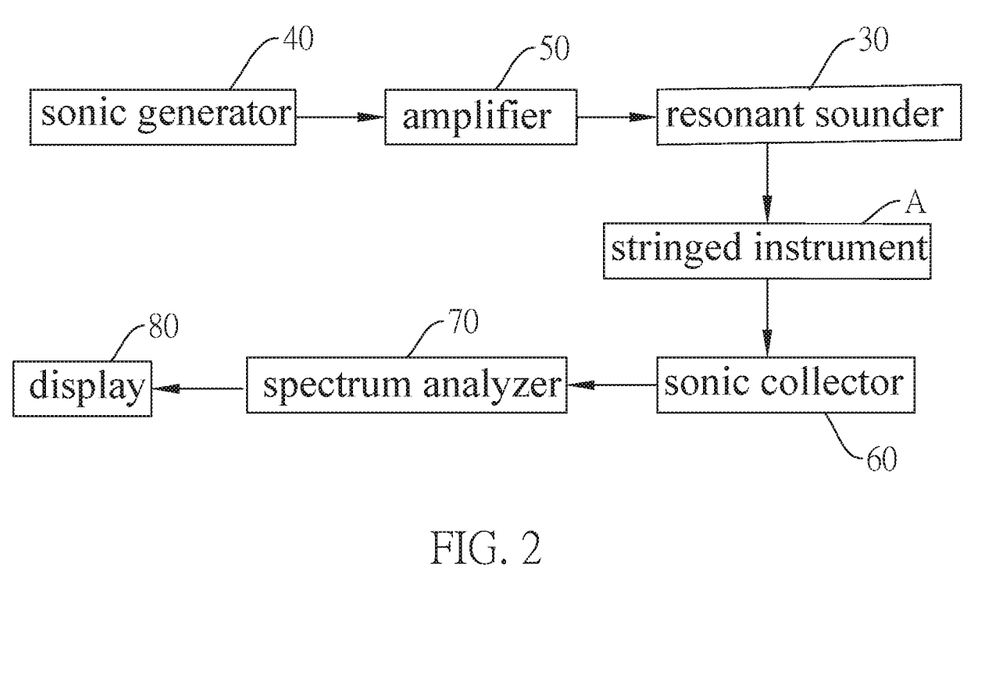
FIG. 2 is a block diagram of a stringed instrument resonance analysis device of the present disclosure.

Refer to FIG. 1 and FIG. 2, FIG. 1 and FIG. 2 are respectively a schematic diagram and a block diagram of a stringed instrument resonance analysis device of the present disclosure. As shown in the drawings, the stringed instrument resonance analysis device of the present disclosure comprises a cabinet 10, a holder 20, a resonant sounder 30, a sonic generator 40, an amplifier 50, at least one sonic collector 60, a spectrum analyzer 70 and a display 80.

The cabinet 10 forms an accommodating space 11 therein, and the inner surface of the cabinet 10 is preferably disposed with a sound-absorbing layer 12. The sound-absorbing layer 12 can prevent the outer noise and inner echo from form standing wave which affect the analysis result.

The holder 20 is disposed in the accommodating space 11 of the cabinet 10. The holder 20 can hold and fix a stringed instrument A which resonance is to be analyzed. In one implementation, the holder 20 comprises a chassis 21 and a rod 22. The stringed instrument A can be placed on the chassis 21, and the rod 22 is connected to the chassis 21 to fix and clamp a neck A3 of the stringed instrument A.

Figure 3:
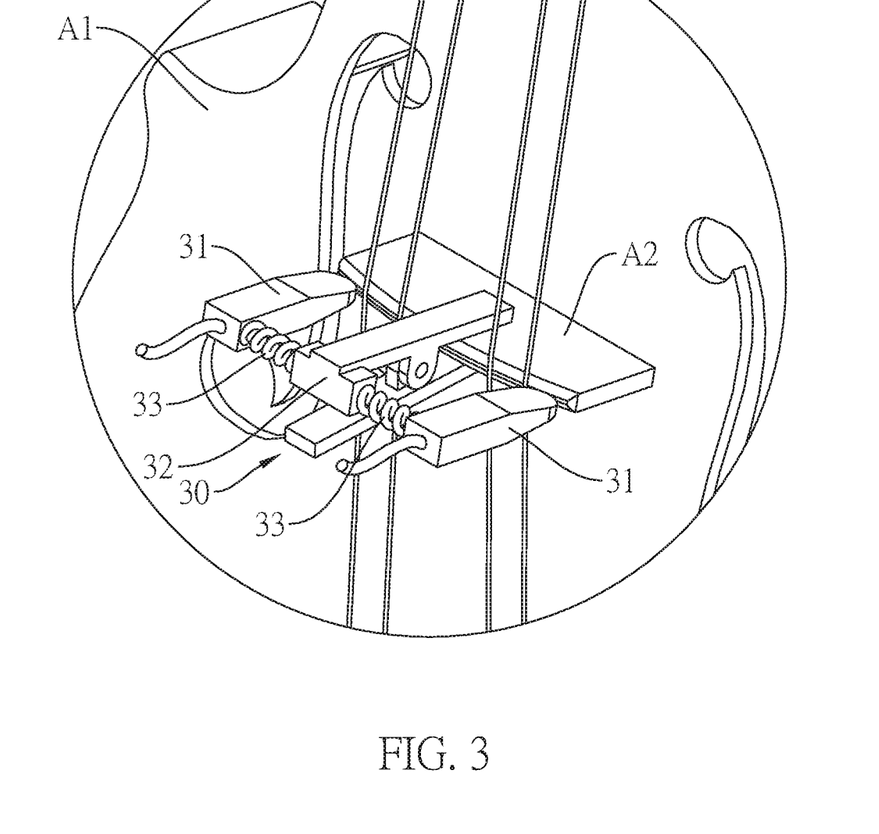
FIG. 3 is a first schematic diagram showing a resonant sounder of the stringed instrument resonance analysis device of the present disclosure.
Figure 4:
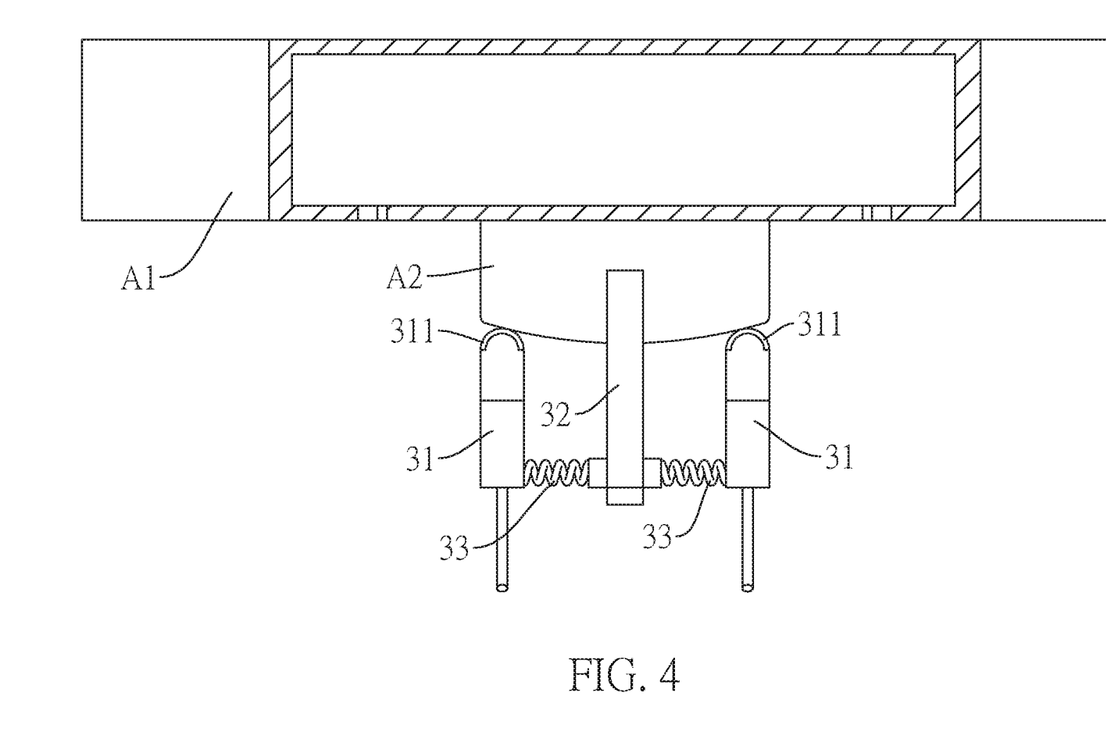
FIG. 4 is a second schematic diagram showing a resonant sounder of the stringed instrument resonance analysis device of the present disclosure.

The resonant sounder 30 is disposed in the accommodating space 11 of the cabinet 10, and is fixed to and clamped by a bridge A2 on the loudspeaker box A1 of the stringed instrument A. Refer to FIG. 3 and FIG. 4, FIG. 3 and FIG. 4 are respectively a first and second schematic diagrams showing resonant sounders of the stringed instrument resonance analysis devices of the present disclosure. The resonant sounder 30 mainly comprises at least one energy converter 31 and a fixture 32, the energy converter 31 can convert receive sonic of different frequencies to corresponding vibration energy, and the fixture 32 is connected to at least one energy converter 31, and used to clamp the bridge A2, such that energy converter 31 is fixed and contacts the bridge A2. Furthermore, the resonant sounder 30 further comprises at least one buffer unit 33, the number of the at least one energy converter 31 is corresponding to the number of the at least one buffer unit 33, and the buffer unit 33 is disposed between the energy converter 31 and the fixture 32. In the implementation, the numbers of the energy converters 31 and the buffer units 33 are two. The buffer unit 33 can absorb the energy which the energy converter 31 vibrates and transmits the fixture 32, such that the resonance can be prevented from forming the interference. The buffer unit 33 can made be of elastic material, and preferably is a flexible plastic, silicone, rubber or spring material, for example, a flexible plastic block, silicone block, rubber block or spring. Moreover, a buffer layer 311 is provided on the contact surface of the energy converter 31 and the bridge A2 to reduce noise, wherein the buffer layer 311 is an elastic material, preferably a silicon film, rubber sheet or latex film.

The sonic generator 40 is connected to the resonant sounder 30, and the sonic generator 40 may be a computer for example, which can set sonic of various frequencies and output the sonic to the resonant sounder 30, so that the resonant sounder 30 performs energy conversion to generate vibration. Furthermore, the amplifier 50 is connected between the resonant sounder 30 and the sonic generator 40, and the amplifier 50 can amplify the sonic output by the sonic generator 40.

According to the above descriptions, when the resonant sounder 30 receives the sonic to generate the vibration, and by using the bridge A2, the vibration energy is transmitted to the loudspeaker box A1, to make the loudspeaker box A1 generate resonance sonic according to the vibration frequency.

The at least one sonic collector 60 is disposed in the accommodating space 11 of the cabinet 10 an adjacent to the loudspeaker box A1 of the stringed instrument A. For example, the sonic collector 60 can be a piezoelectric sensor or microphone, wherein the number of the sonic collector 60 is one, and the sonic collector 60 is disposed in front of a panel of the loudspeaker box A1, in back of a back plate of the loudspeaker box A1 or in side of a side plate of the loudspeaker box A1, such that the sonic collector 60 can collect the resonance sonic of the panel, the back plate or the side plate of the loudspeaker box A1. Or alternatively, as shown in FIG. 1, the number of the sonic collectors 60 are three, and he sonic collectors are respectively disposed adjacent to the panel, the back plate or the side plate of the loudspeaker box A1, so as to collect the resonance sonic of all parts of the loudspeaker box A1 at the same time.

The spectrum analyzer 70 is connected to the at least one sonic collector 60, and the spectrum analyzer 70 can obtain a frequency spectrum through a Fourier transform of the resonance sonic collected by the sonic collector 60, and then analyze and compare the frequency spectrum, so that the resonance abilities of all parts of the stringed instrument A can be evaluated. Furthermore, the spectrum analyzer 70 is connected to the display 80, so that relevant analysis values can be displayed by the display 80.

Figure 5:
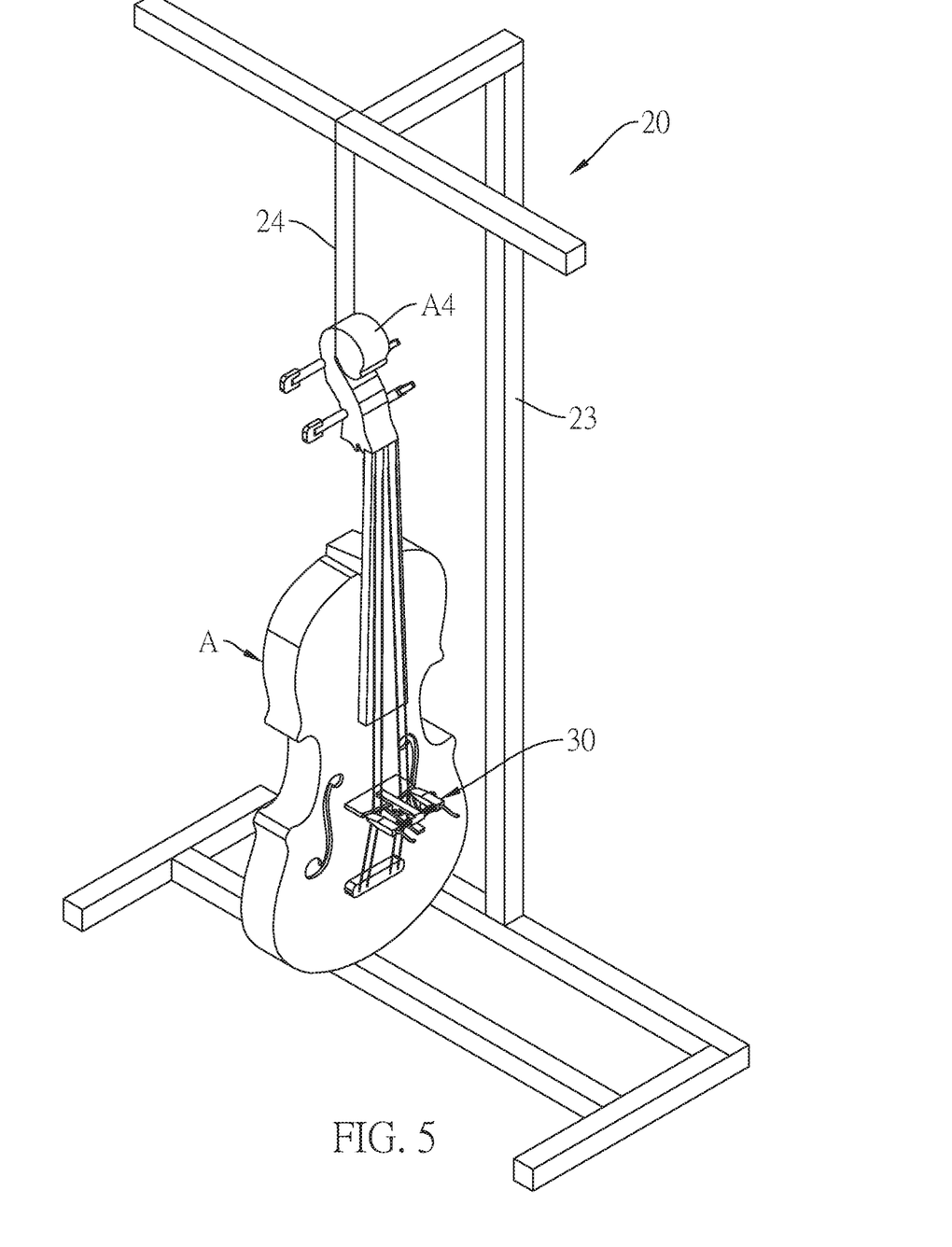
FIG. 5 is a first schematic structural diagram showing a holder of the stringed instrument resonance analysis device of the present disclosure.
Figure 6:
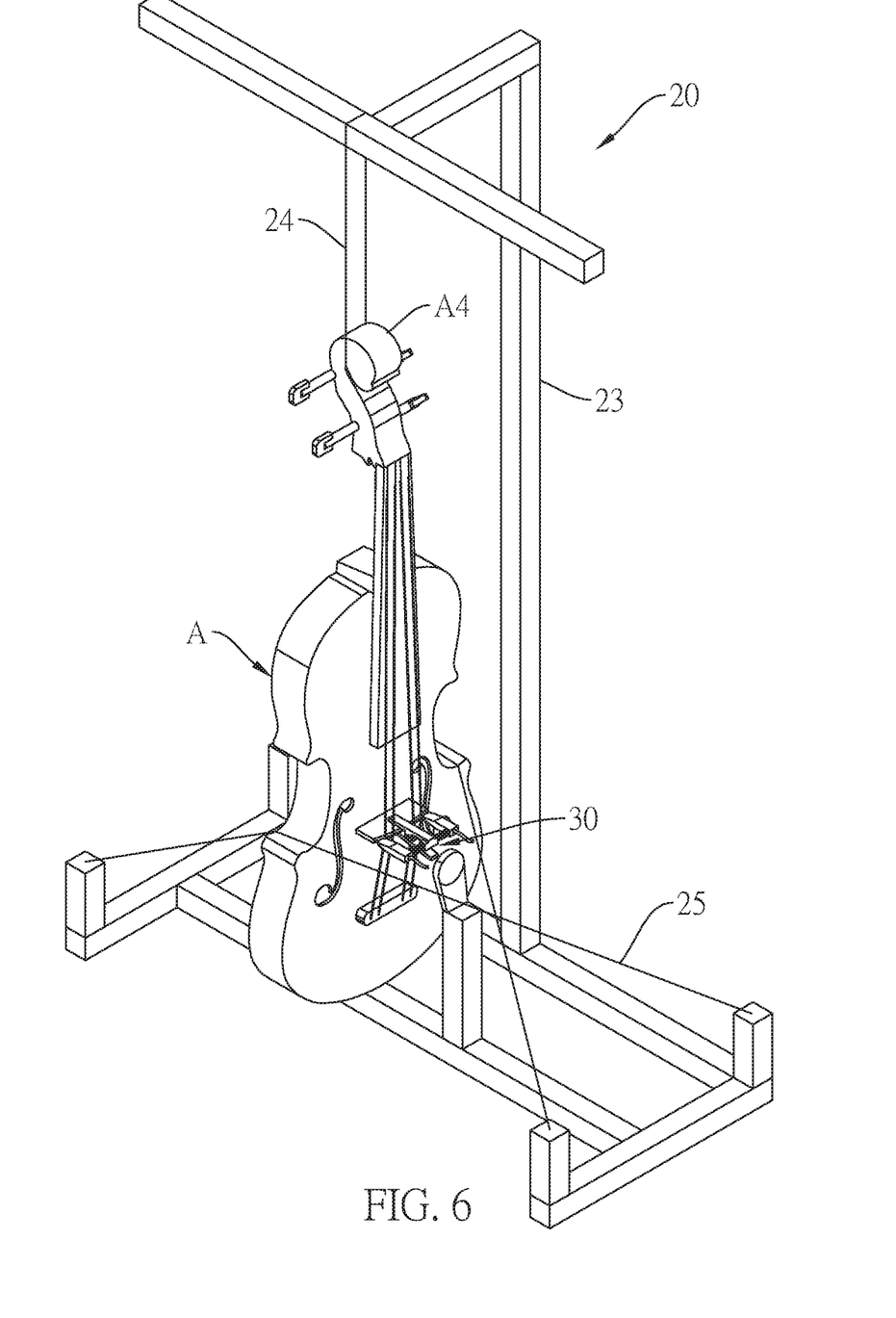
FIG. 6 is a second schematic structural diagram showing a holder of the stringed instrument resonance analysis device of the present disclosure.

Refer to FIG. 5 and FIG. 6, FIG. 5 and FIG. 6 are respectively a first and second schematic structural diagrams showing holders of the stringed instrument resonance analysis devices of the present disclosure. The holder 20 of the present disclosure can be designed to be different from the structure of FIG. 1, and as shown in FIG. 5, the holder 20 comprises a frame 23 and a first thread assembly 24, wherein the first thread assembly 24 is connected to a top part of the frame 23, and the first thread assembly 24 connects to and fixes a volute A4 of the stringed instrument A. Or alternatively, as shown in FIG. 6, the holder further comprises a second thread assembly 25, wherein the second thread assembly 25 is connected to a bottom part of the frame 23, and the second thread assembly 25 connects to and fixes the loudspeaker box A1 of the stringed instrument A.

Specifically, the stringed instrument resonance analysis device of the present disclosure can use different vibration frequencies to perform a complete resonance test on the stringed instrument, and record the energy difference of each frequency, and use accurate scientific data to describe the resonance effect, so that the resonance effect of the stringed instrument is analyzed without deviation. In addition, this present disclosure can analyze the energy of different single-tone resonances and full-scale resonance, so as to know the best range of stringed instrument resonance. At the same time, it can also find adjustments through data analysis to help stringed instrument tuning, so that the wolf tone can be avoided.

To sum up, the present disclosure can achieve the mentioned technical results. The Applicant believes the present disclosure are not anticipated by prior art, and meet the provision of patentability in the patent act, and allowance of the present disclosure is requested respectfully.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A stringed instrument resonance analysis device, used to detect a stringed instrument, comprising:
    a cabinet, forming an accommodating space in the cabinet;
    a holder, disposed in the accommodating space and used to fix and hold the stringed instrument;
    a resonant sounder, disposed in the accommodating space and fixed and clamped to a bridge on a loudspeaker box of the stringed instrument;
    a sonic generator, connected to the resonant sounder;
    at least one sonic collector, disposed in the accommodating space and adjacent to the loudspeaker box of the stringed instrument; and
    a spectrum analyzer, connected to the at least one sonic collector;
    wherein the resonant sounder comprises at least one energy converter and a fixture, the fixture connects to the energy converter, and clamps and fixes the bridge, and a contact surface of the energy converter and the bridge is disposed with a buffer layer.

2. The stringed instrument resonance analysis device of claim 1, wherein an inner surface of the cabinet is provided with a sound-absorbing layer.

3. The stringed instrument resonance analysis device of claim 1, wherein the holder comprises:
    a chassis, wherein the stringed instrument is placed on the chassis; and
    a rod, connected to the chassis and used to clamp and fix a neck of the stringed instrument.

4. The stringed instrument resonance analysis device of claim 1, wherein the holder comprises:
    a frame and a first thread assembly, wherein the first thread assembly is connected to a top part of the frame, and the first thread assembly connects to and fixes a volute of the stringed instrument.

5. The stringed instrument resonance analysis device of claim 4, wherein the holder further comprises:
    a second thread assembly, wherein the second thread assembly is connected to a bottom part of the frame, and the second thread assembly connects to and fixes the loudspeaker box of the stringed instrument.

6. The stringed instrument resonance analysis device of claim 1, wherein the resonant sounder further comprises at least one buffer unit disposed between the energy converter and the fixture, wherein a number of the at least one buffer unit is corresponding to a number of the at least one energy converter.

7. The stringed instrument resonance analysis device of claim 6, wherein the buffer unit is a flexible plastic block, silicone block, rubber block or spring.

8. The stringed instrument resonance analysis device of claim 1, wherein the buffer layer is a silicone film, rubber film or latex film.

9. The stringed instrument resonance analysis device of claim 1, wherein a number of the at least one sonic collector is one, and the sonic collector is arranged in front of a panel of the loudspeaker box.

10. The stringed instrument resonance analysis device of claim 1, wherein a number of the at least one sonic collector is one, and the sonic collector is arranged in back of a back plate of the loudspeaker box.

11. The stringed instrument resonance analysis device of claim 1, wherein a number of the at least one sonic collector is one, and the sonic collector is arranged in side of a side plate of the loudspeaker box.

12. The stringed instrument resonance analysis device of claim 1, wherein a number of the at least one sonic collector is three, and the sonic collectors are respectively disposed adjacent to a panel, a back plate and a side plate of the loudspeaker box.

13. The stringed instrument resonance analysis device of claim 1, further comprising:
    a display, connected to the spectrum analyzer.

14. The stringed instrument resonance analysis device of claim 1, further comprising:
    an amplifier, connected to between the resonant sounder and the sonic generator.

* * * * *